United States Patent [19]

Arndt et al.

[11] 4,361,687

[45] Nov. 30, 1982

[54] METHOD FOR THE POLYMERIZATION OF WATER SOLUBLE MONOMERS

[75] Inventors: Peter J. Arndt, Jugenheim-Seeheim; Klaus Ross; Franz Wenzel, both of Darmstadt, all of Fed. Rep. of Germany

[73] Assignee: Röhm GmbH, Darmstadt, Fed. Rep. of Germany

[21] Appl. No.: 297,100

[22] Filed: Aug. 28, 1981

[30] Foreign Application Priority Data

Oct. 8, 1980 [DE] Fed. Rep. of Germany ....... 3037967

[51] Int. Cl.$^3$ .................. C08L 33/26; C08L 33/14
[52] U.S. Cl. .................. 524/850; 526/312; 526/317; 526/307.6; 526/307.7
[58] Field of Search .......................................... 526/216

[56] References Cited

U.S. PATENT DOCUMENTS 2,564,292  8/1951  Wolf ................................. 260/92.8
3,941,724  3/1976  Bolto ............................... 260/2.1 R

*Primary Examiner*—Joseph L. Schofer
*Assistant Examiner*—Bernard Lipman
*Attorney, Agent, or Firm*—Curtis, Morris & Safford

[57] ABSTRACT

What is disclosed is a method for making a water soluble polymer of low molecular weight which forms aqueous solutions of low viscosity, which method comprises polymerizing an $\alpha,\beta$-unsaturated water soluble monomer or a mixture of such monomers in a concentrated aqueous solution of said monomer or mixture in the presence of a free radical forming initiator and of formic acid or a water soluble salt thereof as a chain transfer agent.

5 Claims, No Drawings

METHOD FOR THE POLYMERIZATION OF WATER SOLUBLE MONOMERS

The present invention relates to a method for making low molecular weight polymers by polymerizing corresponding monomers in the presence of formic acid or a salt thereof as a chain transfer agent. More in particular, the method relates to polymerizing water soluble monomers in aqueous solution to form concentrated solutions of the corresponding water soluble polymers.

The present state of the art employs sulfur compounds, for example, as chain transfer agents for achieving a desired viscosity in such a polymer product. Thus, according to U.S. Pat. No. 3,945,843, water soluble copolymers of acrylic acid and methacrylates having molecular weights from 5000 to 15,000 are obtained if an aqueous solution of the monomers is combined with 5 to 20 percent, and particularly from 10 to 15 percent, by weight of the monomer, of thioglycolic acid and polymerization is effected in the presence of a free radical forming initiator such as potassium persulfate. As a result of the redox exchange effect between potassium persulfate and thioglycolic acid, the polymerization begins rapidly and spontaneously at room temperature and reaches a temperature of 100° C. or more in a short period of time.

This method is difficult to control and leads to variable results. The large amount of sulfur compounds found in the end product is often undesirable. Also, even other mercaptans are used, their amount cannot be reduced if products of low viscosity are sought.

The present invention has as its object a polymerization method the course of which is controllable and which forms a product always having the same properties and, further, to avoid the use of large amounts of sulfur-containing chain transfer agents.

It has been found that this object can be achieved by the use of formic acid as a chain transfer agent.

P. Raghuram et al., Journal of Polymer Science, Part A-1, 2379–2385 (1969) have investigated the transfer effect of formic acid in the polymerization of ethyl acrylate and have found that this effect is very low and in any event less than that of acetic acid or butyric acid. The effect is less than 1/30th of the transfer effect of carbon tetrachloride, which is known to be a weak chain transfer agent.

Thus, it is surprising that formic acid proves to be an effect chain transfer agent for water soluble monomers or monomer mixtures. The acid can be employed in an amount, for example, of 0.1 to 5 percent by weight of the monomer or monomers being polymerized: the preferred amount is between 0.5 and 2 percent by weight of the monomers. Instead of free formic acid, an equivalent amount of its water soluble salts, for example the alkali metal salts, can be used as a rule.

The viscosity reducing effect of formic acid is evident from the polymerization of methacryloxyethyl-trimethyl-ammonium chloride in concentrated aqueous solution. In the absence of chain transfer agents, polymers having molecular weights of several millions are obtained, one percent aqueous solutions of which polymers have viscosities in the range from 3000 to 10,000 mPa.s at 20° C. With one percent of formic acid, under otherwise similar conditions, a polymer is prepared a one percent aqueous solution of which has a viscosity of only about 50 mPa.sec up to at most 200 mPa.s at 20° C. This corresponds to a reduction in the molecular weight to about 10,000 to 50,000.

The polymerization is carried out in concentrated aqueous solution, which terminology generally refers to solutions having a solids concentration of more than 30 percent and, particularly, more than 40 percent, by total weight of the solution. According to the solubility of the monomer or monomer mixture employed, solutions having a solids content of up to about 90 percent can be obtained by polymerization. The polymer solutions which are formed are in this case are almost solid bodies which can be broken and ground or milled.

Water is always the predominant solvent, but need not be the only solvent. The solutions can contain, in addition to water, other organic liquids which are miscible with water such as lower alkanols, ketones, glycols, or tetrahydrofuran or formamide. The pH value of the solution can be within a broad range: pH values between 2 and 12 are preferred.

The concentrated solution can be polymerized as such, for example in a stirred vessel or on a continuous moving belt. However, the solution can also be distributed or emulsified in the form of drops in an organic liquid which is not miscible with water or has only limited miscibility therewith, for example oil, gasoline, or chlorohydrocarbons. In this case, water soluble pearl polymers or organosols of reduced molecular weight are obtained in a manner known in the art.

The monomers to be polymerized should be at least sufficiently water soluble that they form a concentrated solution under the polymerization conditions. If copolymers are prepared, it is sufficient if the monomer mixture as a whole forms a concentrated aqueous solution although individual monomer components of the mixture, alone, may have a reduced water solubility. Preferred monomers are $\alpha,\beta$-unsaturated water soluble compounds such as acrylic acid and methacrylic acid, their water soluble salts and amides and their hydroxy- and amino-substituted alkyl esters. The alkyl groups in such alkyl esters can have from 2 to 4 carbon atoms, for example. The amino alkyl esters can also be present in the form of their salts or their quaternization products. Preferred examples of these monomers are acrylic acid, acrylamide, dimethylaminoalkyl esters of acrylic acid or of methacrylic acid (among these, the corresponding ethyl ester and neopentyl ester are in turn particularly preferred), as well as N-dimethylaminopropyl methacrylamide and its salts, and the quaternization products, prepared with methyl chloride or dimethyl sulfate, of the aforementioned monomers containing amino groups. Further water soluble monomers which can be polymerized according to the invention are vinyl pyrrolidone, vinyl imidazole, vinyl imidazoline, and maleic acid, fumaric acid, and itaconic acid, as well as the salts, half esters, half amides, and amino- or hydroxy-substituted lower alkyl esters of these acids.

As comonomers which can be present in a monomer mixture without themselves forming concentrated aqueous solutions, the lower alkyl esters of acrylic acid and/of methacrylic acid, particularly methyl acrylate and ethyl acrylate, as well as acrylonitrile or methylacrylonitrile and vinyl acetate are mentioned as examples.

The polymerization is initiated in a manner known in the art with free radical forming initiators which are stimulated to decomposition thermally or by means of ultraviolet radiation. Important examples of these initiators are the alkali metal persulfates, azobis-isovalerianic acid and its salts, benzoin, and benzoin ethers. The initiators are employed in an amount from about 0.01 to 1 percent, by weight of the monomer. The polymerization temperature depends on the decomposition temperature of the initiator and the concentration of the monomer solution and, for example, is between 20° C. and 150° C. In order to achieve the most complete conversion possible, some initiator may again be added after termination of the polymerization, to the extent that the batch is still liquid.

The concentrated polymer solutions obtained are highly viscous to solid and, in the latter case, can be ground to form a water soluble powder product. The liquid or gel-like solutions can be dried to form solid products using known methods or can be sold as concentrates and diluted to the desired concentration with water at the point of use. The preparation of the viscous polymer solution as a water-in-oil suspension or a water-in-oil emulsion, which is also characterized as an "organosol", is more advantageous.

The polymers are useful, inter alia, as suspending agents and dispersing agents for forming slurries of solids, as sedimentation or flocculating agents, for example in washing gravel, as additives for adjusting viscosity in acid-hardening lacquers, and as hair conditioning agents.

A better understanding of the present invention and of its many advantages will be had by referring to the following specific Examples, given by way of illustration.

EXAMPLE 1

207.5 g of methacryloxyethyl-trimethyl-ammonium chloride are dissolved in 36.5 g of completely desalted water at 50° C. and form an 85 percent solution. This is combined with 0.12 g of hydroquinone monomethylether, 0.01 g of benzoin, and 1.4 g of formic acid. The solution is exposed to light of short wave length ("Osram" lamp 40 W/b 70) while in a metal pan in a layer thickness of 20 mm. Polymerization occurs within 30 minutes during which the temperature climbs to a maximum of 120° C. and gives a hard millable product. The viscosity of a one percent solution of the product is 50 mPa.s at 20° C.

EXAMPLE 2

A monomer solution having the following composition is prepared at 60° C.:

| | |
|---|---|
| 100 | g of acrylamide |
| 100 | g of methacryloxyethyl-trimethyl-ammonium chloride |
| 20 | g of adipic acid |
| 20 | g of saccharose |
| 33 | g of completely desalted water |
| 0.03 | g of ethylenediamine-tetraacetic acid (Na salt) |
| 0.05 | g of benzoin |
| 0.001 | g of N,N—diphenyl-1,4-phenylene diamine |
| 0.8 | g of formic acid. |

Polymerization takes place in a polyester film lined metal pan, the base of which is constructed to serve both as a heating chamber and a cooling chamber. The polymer solution is present in the pan in a layer thickness of 10 mm. Polymerization occurs under the influence of light of short wavelength ("Osram" lamp 40 W/70). At the beginning of the polymerization, the bottom of the pan is heated to 50° C. after which the heat of polymerization is led off by cooling with water at a temperature of 20° C. A hard millable product forms, which as a one percent aqueous solution has a viscosity of 150 mPa.s at 20° C.

EXAMPLE 3

72 g of acrylic acid dissolved in 138 g of completely desalted water are neutralized with 80 g of 50 percent sodium hydroxide in the presence of 0.2 g of hydroquinone monomethyl ether. 141 g of acrylamide, 24 g of saccharose, 1.25 g of formic acid, 0.03 g of benzoin ethyl ether, and 0.015 g of ethylenediamine-tetraacetic acid (Na salt) are stirred into the solution, heated to 60° C. The solution, in a layer thickness of 10 mm, is exposed to light of short wavelength ("Osram" lamp 40 W/70) while in an open metal pan which has been lined with a polyester film. After polymerization is complete, a jelly like polymer forms. After drying, the polymer gives a millable product, a 1 percent solution of which in water has a viscosity of 50-100 mPa.s at 20° C.

EXAMPLE 4

415 g of methacryloxyethyl-trimethyl-ammonium chloride are dissolved in 73 g of water at 50° C. and the 85 percent solution is combined with 0.25 g of hydroquinone monomethyl ether, 0.04 g of ammonium persulfate, and 2.8 g of formic acid. The solution is warmed to 80° C. over a period of 20 minutes and warms itself to 120° C. as a result of the heat of polymerization. After 30 minutes the polymerization is essentially complete. The resulting product is hard and millable and has a viscosity of 100 mPa.s as a one percent aqueous solution at 20° C.

COMPARISON EXAMPLE

The technique according to Examples 1-3 is repeated without using formic acid. Polymers are obtained having the following viscosity values at 20° C. when in the form of a one percent aqueous solution:

| Repeated Example | Viscosity (mPa.s) |
|---|---|
| 1 | 5200 |
| 2 | 4000 |
| 3 | 8000 |

What is claimed is:

1. A method for making a water soluble polymer of low molecular weight which forms aqueous solutions of low viscosity, which method comprises polymerizing an $\alpha,\beta$-unsaturated water soluble monomer or a mixture of such monomers selected from the group consisting of acrylic acid, methacrylic acid, the water soluble salts of acrylic acid and methacrylic acid, acrylamide, methacrylamide, the aminoalkyl esters of acrylic acid and methacrylic acid, and the salts and quaternization products of said aminoalkyl esters of acrylic acid and methacrylic acid, in a concentrated aqueous solution of said monomer or mixture in the presence of a free radical forming initiator and of formic acid or a water soluble salt thereof as a chain transfer agent.

2. A method as in claim 1 wherein said aqueous solution of said monomer or monomer mixture has a concentration greater than 40 percent.

3. A method as in claim 1 wherein said $\alpha,\beta$-unsaturated water soluble monomer is a member of the group consisting of acrylic acid, methacrylic acid, and the water soluble salts, the amides, and the hydroxy-substituted and amino-substituted alkyl esters and alkylamides of these acids.

4. A method as in claim 1 wherein formic acid or a salt thereof is present in an amount from 0.1 to 5 percent by weight of said monomer or monomer mixture.

5. A method as in claim 1 wherein formic acid or a salt thereof is present in an amount such that said water soluble polymer forms a one percent aqueous solution having a viscosity of at most 250 mPa.s at 20° C.

* * * * *